United States Patent [19]
Wolf et al.

[11] 3,729,808
[45] May 1, 1973

[54] MILLING CUTTER AND APPARATUS
[75] Inventors: Heinz K. Wolf; Ralph W. Lacey, both of Farmington, Mich.
[73] Assignee: Kysor Industrial Corporation, Cadillac, Mich.
[22] Filed: July 28, 1971
[21] Appl. No.: 166,739

[52] U.S. Cl. ..................29/105 R, 33/185, 76/101
[51] Int. Cl. ..............................................B26d 1/12
[58] Field of Search ....................29/105 R, 105 A, 29/103 R, 103 A

[56] References Cited
UNITED STATES PATENTS
3,138,847 6/1964 Berry....................................29/105 R
3,091,138 5/1963 Berry....................................29/105 R
2,945,288 7/1960 Berry....................................29/105 R FOREIGN PATENTS OR APPLICATIONS
1,483,857 5/1967 France..................................29/105 A

*Primary Examiner*—Leonidas Vlachos
*Attorney*—Price, Heneveld, Huizenga & Cooper

[57] ABSTRACT

This disclosure relates to milling cutter apparatus employing a cutter body with peripheral slots that extend through the body and receive blade inserts retained normal to the cutter body end faces by wedges, the inserts preferably being positioned by a novel magnetically retained hand gauge, with or without a novel supplemental setting stand.

6 Claims, 16 Drawing Figures

Patented May 1, 1973

INVENTORS
HEINZ K. WOLF
RALPH W. LACEY
BY Price Heneveld,
Huizenga & Cooper
ATTORNEYS Patented May 1, 1973

INVENTORS
HEINZ K. WOLF
RALPH W. LACEY
BY Price, Heneveld,
Huizenga & Cooper
ATTORNEYS Patented May 1, 1973
3,729,808
4 Sheets-Sheet 3
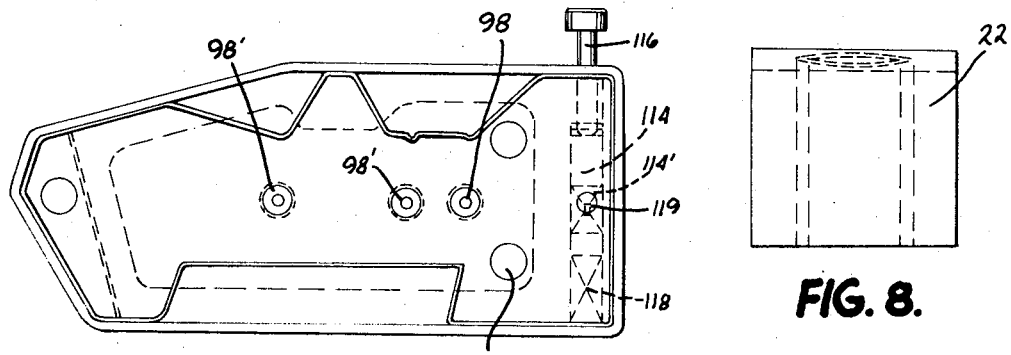
FIG. 13.
FIG. 8.
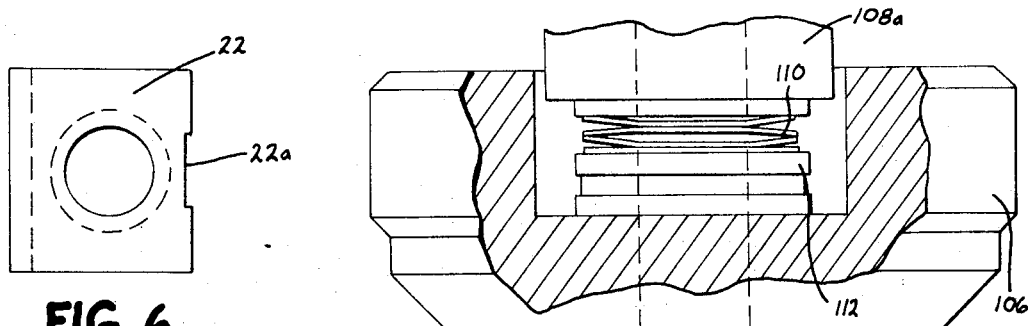
FIG. 6.
FIG. 16.
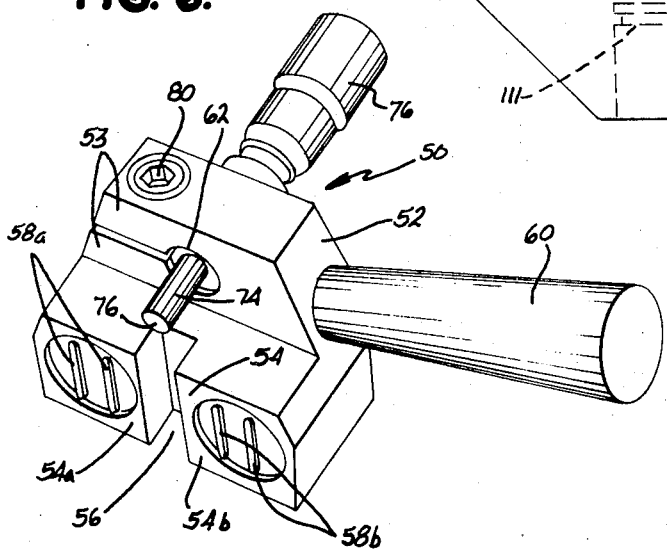
FIG. 9.
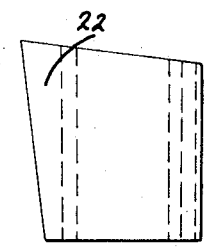
FIG. 7.
INVENTORS
HEINZ K. WOLF
RALPH W. LACEY
BY Price, Heneveld,
Huizenga & Cooper
ATTORNEYS INVENTORS
HEINZ K. WOLF
RALPH W. LACEY
BY Price, Heneveld
Huizenga & Cooper
ATTORNEYS 3,729,808

MILLING CUTTER AND APPARATUS

BACKGROUND OF THE INVENTION

This invention relates to machine tool equipment, and more particularly, to milling machine cutters and apparatus.

Milling cutters intended for slotting functions, i.e., so-called slotting cutters, employing insert blade elements have generally been of two major types. One type had slots cut through the periphery of the cylindrical, disk like cutter body, at alternate acute angles to the two opposite end faces of the cutter body. Using this construction, the insert blades were somewhat difficult to maintain in proper alignment in these slots. The wedges holding the blades were mounted offset toward alternate end faces of the cutter body to secure the blades. It has been determined that this wedge arrangement provides incomplete support for the blades, particularly since the wedges are tapered rearwardly to be certain that the wedges do not interfere during slotting. Further, since these individual slots have to be separately machined at substantial expense, the second type, which also requires expensive individual slot machining, came into favor. This second type has dead end slots cut into the opposite end faces of the cutter body. The slots or pockets are cut only part way through the cutter body, in contrast to the first type which has the slots extending clear through the body. Therefore, the insert blade abuts the inner end of the pocket to prevent its movement away from the work during machining to cause misalignment of the blades. However, as will be readily appreciated, for the blades to be accurately aligned with each other when mounted, all of the slots have to be the very same size as do all of the blades.

Hence, both of these major types of slotting cutters involve separate relatively expensive machining of each slot to exact controlled acute angles. Further, if an attempt were made with either type to perform side milling functions rather than slot milling, only half of the cutter blades could be in operation at one time. The blades on the other side of the body could not be shifted over into position on the opposite side because they would be at the wrong angle (first type) or could not be moved past the inner end of the pocket (second type).

SUMMARY OF THE INVENTION

An object of this invention is to provide a slotting cutter that is formable relatively inexpensively with through slots that are actually parallel to the axis of the cutter body. The slots need not be carefully machined to small acute angles. The blade inserts in the novel structure can be shifted laterally to alternate slot cutting arrangement, or to like half-side milling arrangement.

Each blade is effectively secured in place by a wedge element substantially centrally located in the slot. The wedge elements preferably extend substantially the full width of the slot for excellent support. The novel structure allows the wedges to be wider than the blade, thereby providing greater holding power than the conventional unit wherein the wedges are smaller than the blade so that the blade overhangs the wedge.

A special relief is formed in the rear face of each wedge, thereby assuring at least a two line engagement between the wedge and rear slot face to prevent slippage even though expensive machining steps are not performed on the slot rear faces.

The lateral position of the blades can be set by a special magnetically retained hand gauge. The gauge has a reference surface magnetically attachable to the end faces of the milling cutter body, and a blade engaging positioner controlled in correlation with indicator means to set the protrusion of a blade relative to the cutter body end faces.

These and several other objects, advantages and features of the invention will be apparent upon studying the following detailed specification in conjunction with the drawings.

BRIEF DESCRIPTION OF THE DRAWINGS

FIG. 6 is a plan view of the slotting cutter wedge;

FIG. 7 is a side elevational view of the wedge in FIG. 6;

FIG. 8 is a front elevational view of the wedge in FIGS. 6 and 7;

FIG. 9 is a perspective view of a novel magnetically retained hand gauge mechanism for exactly positioning insert blades in the slotting cutter body;

FIG. 13 is a plan view of a novel blade setting stand assembly;

FIG. 16 is an enlarged fragmentary, partially sectioned view of a portion of the apparatus in FIG. 14.

DESCRIPTION OF THE PREFERRED EMBODIMENT

Figure 1:
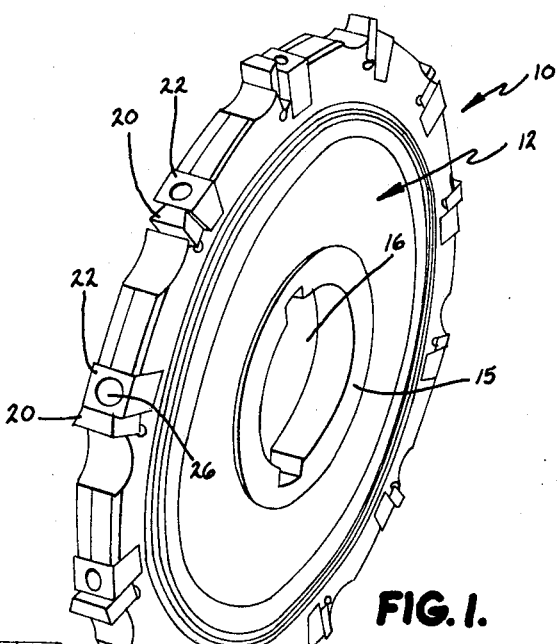
FIG. 1 is a perspective view of the novel cutter.

Referring now to FIGS. 1-8, the milling cutter 10 includes a generally flat cylindrical body 12 having 2 opposite end faces 14 and 14', an axial bore 16 in hub 15 for mounting on a drive shaft or arbor, and a plurality of spaced slots 18 in its outer periphery, such slots each extending clear through the axial extent of the body between the end faces. End faces 14 and 14' and particularly outer peripheral portions 14a and 14'a are parallel to each other. Positioned in the respective slots is a plurality of insert cutter blades 20 and a plurality of blade retaining wedges 22.

The forward portion of each slot 18 includes a front face 18a that is perpendicular or normal to the opposite end faces 14 and 14' of the cutter body. This face 18a has a 0° angle to the cutter body axis. The front portion of the slot also includes a radially outwardly facing shoulder 18b upon which the lower edge of insert blade 20 rests. A small diagonal recess 18c is provided at the juncture of shoulder 18b and radially extending front face 18a for receiving the corner of each insert blade with substantial clearance therebetween, so as not to interfere with the full engagement of the lower edge of the blade with shoulder 18b and the front face of the blade with face 18a. The rear portion of slot 18 is radially deeper than the forward portion thereof to receive wedge 22. The rear face 18d of slot 18 is at an angle relative to the front face 18a of approximately 7°, converging radially inwardly of the body relative thereto. Each blade 20 extends rearwardly in the slot behind the rear face 18b' of shoulder 18b. In the radially inner surface or bottom of the rear portion of the slot is a threaded cavity 18e for receiving the fastener 26 of the respective wedge 22.

Fasteners 26 for wedges 22 are centrally located between the end faces 14 and 14' of the cutter body. Further, each wedge 22 preferably extends substantially the width of the cutter body, effecting full support for the insert blades 20 whether the blade is positioned protruding from one end face or from the other. Each wedge is wider than the blade it retains, thereby providing excellent holding power.

Figure 4:
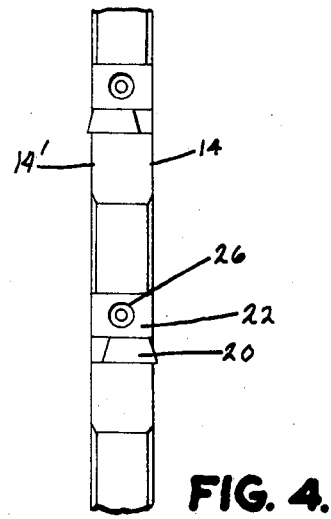
FIG. 4 is a fragmentary edge elevational view of the novel cutter, depicting the blades, slots and wedges.
Figure 3:
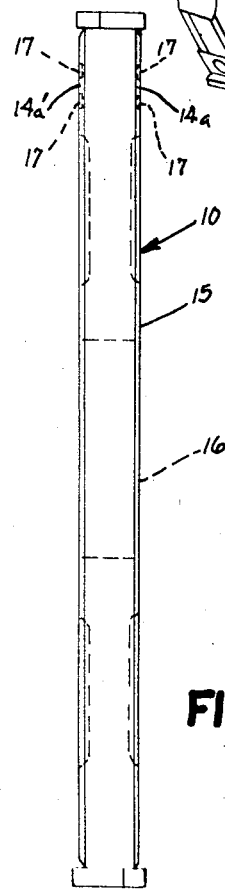
FIG. 3 is an edge elevational view of the novel cutter, but not depicting all of the blades, slots and wedges.
Figure 5:
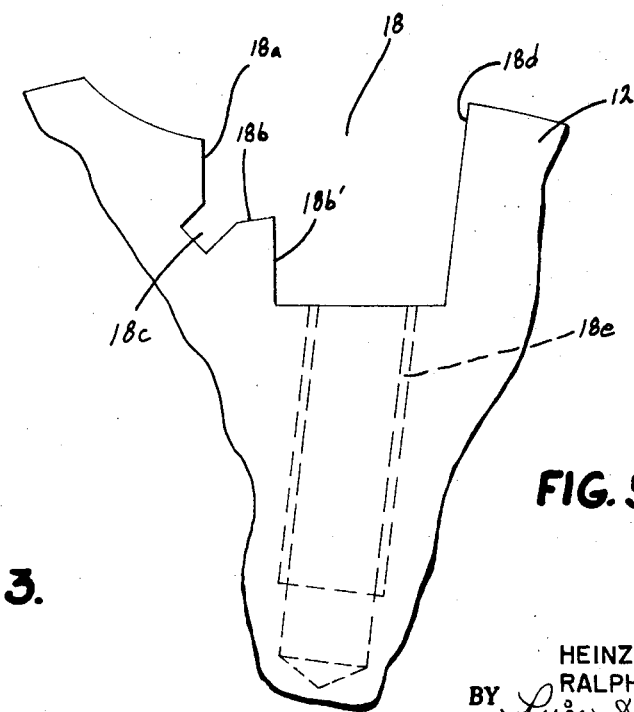
FIG. 5 is an enlarged end elevational view of a portion of the novel cutter body showing the configuration of one of the slots in its periphery.
Figure 2:
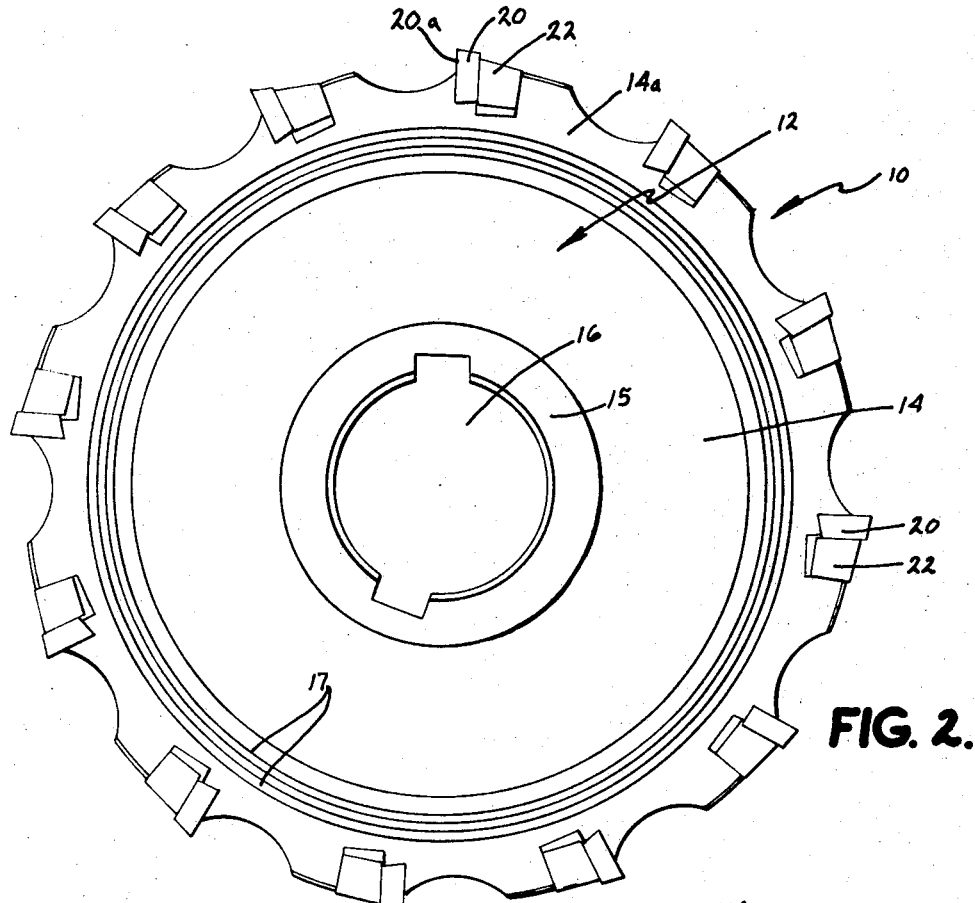
FIG. 2 is an end elevational view of the novel cutter.
Figure 14:
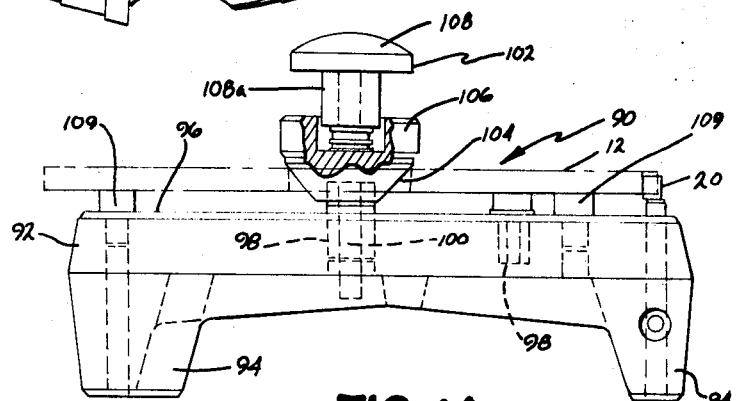
FIG. 14 is a front elevational view of the stand assembly in FIG. 13.
Figure 15:
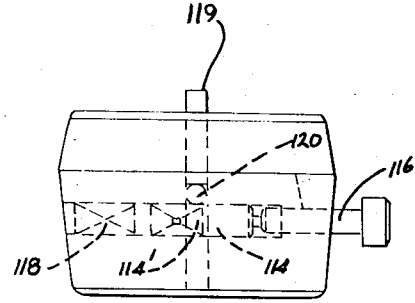
FIG. 15 is an end elevational view of the stand assembly in FIG. 14.

Since the front faces 18a of the respective slots are normal to the opposite axial end faces 14 and 14', insert blades 20 can be shifted laterally to protrude from one selected side or from alternate sides as illustrated in FIG. 4.

A special relief 22a (FIG. 6) several thousandths of an inch deep is formed on the rear face of wedge 22. This relief extends radially the full extent thereof to form a pair of radially oriented edges. This assures at least a two line contact between the rear face of the wedge and the rear face 18d of the cutter body. This eliminates the necessity of extremely accurate machining of these faces even allowing them to be formed slightly convex, yet without any resulting "high spots" on the faces causing stability problems. I.e., this eliminates the tendency for a wedge to be unstable and movable on a localized high spot on the rear face of the slot.

The outer peripheral portion of cutter body 12 is formed with a controlled dimensional thickness between portions 14a and 14'a of faces 14 and 14'. This particular dimensional control between these two parallel faces, and perpendicular forward faces 18a of slots 18, enable the blade inserts to be specifically mounted with controlled protrusion from the end faces of the cutter body to form a slot of predetermined width. That is, by using these two opposite end faces adjacent the outer periphery of the cutting body as reference planes, the width of the slot and position of the cutter blades can be exactly matched. This is achieved by having the alternate blades protrude beyond the adjacent cutter body face an amount equal to one-half of the numerical difference between the thickness of the cutter body and the width of the slot to be formed into the work by the slotting cutter. Preferably this is done with the novel gauge structure depicted in FIGS. 9–12. The cutter body also includes special grooves 17 on its faces, as will be described hereinafter.

This gauge assembly 50 includes a gauge body 52 having a flat reference surface 54 thereon. Abutment surface 54 is preferably formed in two segments 54a and 54b separated by an elongated slot 56. This slot has sufficient width to receive the protruding edge of a blade 20 with clearance. Mounted within these surface portions 54a and 54b is a pair of conventional magnetic elements 58a and 58b respectively, each having a pair of magnetic poles. These magnetic retainers are recessed slightly below the plane of flat surfaces 54a and 54b for magnetically retaining surfaces 54a and 54b against the outer peripheral flat surface 14a or 14'a astraddle of an insert blade 20. In other words, the insert blade 20 is aligned generally with slot 56 to protrude thereinto as far as necessary. Body 52 includes a handle 60 for manually applying the gauge to a milling cutter body or removing it therefrom. Extending through body 52 adjacent slot 56 is a bore 62 into which a calibrated micrometer element extends and into which it is secured. This micrometer probe 70 includes a fixed portion 72 gripped within bore 62 by reason of the tightening action of bolt 80 extending through the bifurcated fingers 53 adjacent bore 62. Protruding from the bore end portion 72 generally in alignment with slot 56 is an extended blade positioner 74 which has a flat axial forward end 76. This positioner 74 is axially movable toward and away from the plane of reference surface 54 with rotational actuation of control means 76 protruding from the opposite end of the body and constructed in a manner typical of a micrometer. This control includes indicator means 78 pre-set relative to the fixed reference face 54 to read the distance between the planes of face 76 and face 54. Thus, the amount of protrusion of insert blade 20 laterally of the cutter body, i.e., laterally of face 14a or 14'a can be exactly determined in an extremely handy manner.

Figure 12:
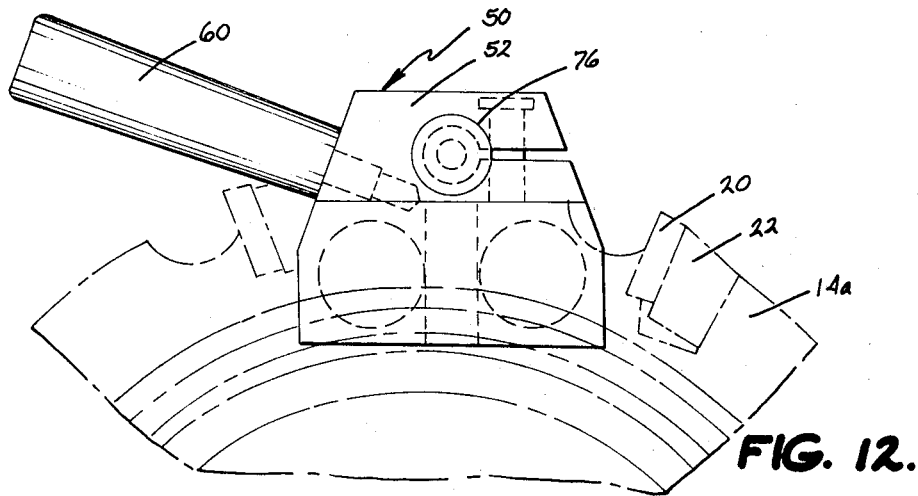
FIG. 12 is an end elevational view of the mechanism in FIG. 11 in the direction of the arrow XII in FIG. 11.
Figure 11:
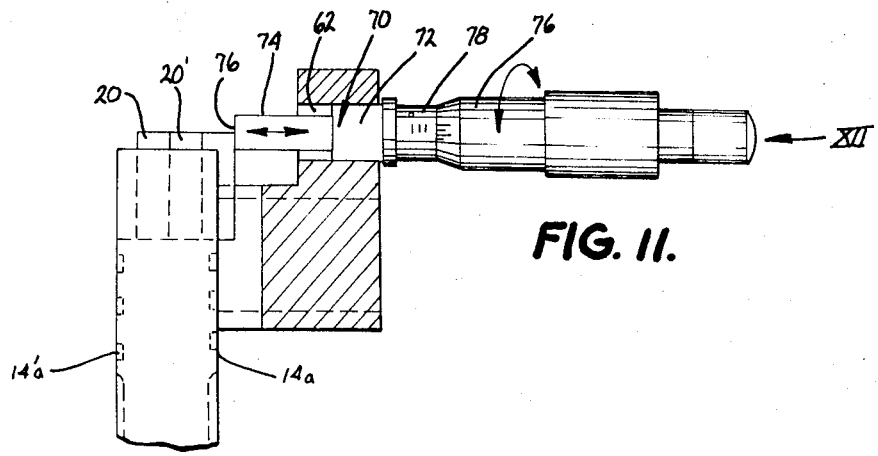
FIG. 11 is a partially sectioned side elevational view of the mechanism in FIG. 9, shown positioning an insert blade relative to the cutter body.
Figure 10:
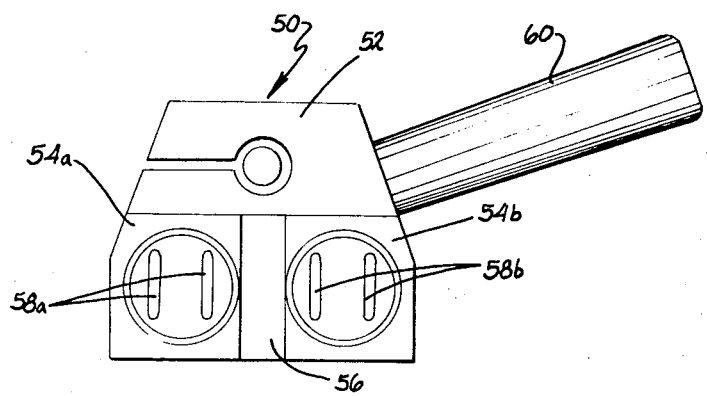
FIG. 10 is a front elevational view of the mechanism in FIG. 9.

For example, if the cutter tool is to be used to form a slot of a pre-determined width in a workpiece, it is only necessary to note the exact preformed width of cutter body 12 at the outer periphery, i.e., between faces 14 and 14', position the micrometer indicator such that the distance between forward face 76 and reference plane 54 is equal to one-half of the difference between the cutter body width and the slot width desired, position the gauge on face 14a as in FIGS. 11 and 12, shift blade 20 against face 76, (FIG. 11) and tighten the wedge 22 for that blade. Next, the micrometer device is placed on the opposite face 14'a and the next blade is positioned so that it protrudes from the opposite face the same amount. By setting all of the blades this amount, the exact slot width desired will be formed. It will be realized that, although such is not the preferred mode of setting the blades, such blades may protrude different amounts from the opposite ends of the cutter body, e.g., protruding on one end a like amount of "$x$" inch, and protruding on the opposite end a like amount of "$y$" inch. In such instance, the gauge would be set once for those on one end, and set again for those on the opposite end.

Annular grooves 17 in the opposite end faces of the cutter body include at least one groove in each face, serving to collect small steel particles clinging to the poles of the gauge magnets. These "dirt" grooves may, for example, be about 0.120 inch wide and 0.030 inch deep. The grooves also help to reduce the end face area which must be kept free from nicks.

Alternatively, instead of setting all of these cutter blades 20 with the unique device shown in FIGS. 9–12, only the first one will be set with the device and the remaining ones then set on the special fixture stand in FIGS. 13–16, using the first one as a standard.

Referring to FIGS. 13–16, the novel setting stand assembly 90 includes a support stand 92 with downwardly protruding feet 94 and a generally flat upper surface 96. Extending down into the stand is a plurality, here shown to be three in number, of tapped recesses 98 and 98' adapted to selectively receive the threaded protruding alignment stem 100 of a retainer sub-assembly 102 for a cutter body 12. This retainer sub-assembly includes a frustoconically shaped downwardly oriented surface 104 on a bushing 106. This shape enables it to fit into several different size bores in different cutters. In the upper portion of the bushing is a recess which receives the lower cylindrical end 108a of a knob mechanism 108. The knob is mounted on the upper end of stem 100 and is vertically shiftable relative to bushing 106 but biased in the upward direction by a plurality of generally flat compression springs 110 (FIG. 16) retained by a retaining ring 111. Springs 110 are beneath end 108a and on top of a rotational bearing 112 that enables bushing 106 to be rotated relative to the stand. A cutter body 12 can be readily retained on the stand in flat condition (as illustrated) by causing the tapered surface 104 to be held in the bore of the cutter body. Threading alignment stem 100 into recess 98 will result in a downward pressure of bushing 108 against the cutter body, thus causing the body to lie flat on three reference buttons 109 or two reference buttoms and one combination tapped recess and reference button 98'. Two of the buttons 109 are positioned radially outwardly from the recess 98 and 98' sufficiently to cause these buttons, and particularly the flat upper surfaces thereof, to engage the accurately machined outer peripheral portions 14a or 14'a of the cutter body. Since the upper surfaces of reference buttons 109 are also accurately machined, the cutter body will rest flat thereagainst. Preferably, reference buttons 109 are located at various radial distances outwardly from selective ones of recesses 98 to enable a variety of sizes of cutter bodies to be positioned on the stand merely by inserting stem 100 in the selected bore 98 or 98'.

Stand 92 also supports an upwardly protruding, vertically adjustable blade setting stop 119, the upper surface of which is to engage the side edge of a cutting blade insert on the cutter body. Element 119 can be vertically adjusted with the mechanism illustrated in FIG. 15. More specifically, engaging the lower axial end of element 119 is a ball 120, which in turn is supported upon a tapered end 114' of a transverse elongated adjustment member 114. Member 114 can be horizontally adjusted in its position by a threaded connection between adjusting element 116 and the support stand. A compression spring 118 biases member 114 against member 116. Hence, by adjusting member 114 axially of its length, its frustoconical surface 114' will raise or lower ball 120 and element 119 an exactly controlled amount.

This stand assembly 90 can be employed for setting insert blade elements 20 axially of the cutter body, using one of the blade elements pre-set by magnetic device 50 as a standard. That is, the cutter assembly with all of the blades in position but only one or two being pre-set, is placed on the stand, inserting stem 100 in the appropriate recess 98 to cause the outer peripheral portion 14a or 14'a to rest upon reference buttons 109. Pressure is applied through springs 110 to hold the cutter assembly in position, during which adjuster 116 is shifted to cause setting stop 119 to move upwardly until it engages the side edge of the pre-set blade insert. Then, using the position of 119 as a reference, the cutter body is rotated on reference buttons 109 or 98', loosening the wedge 22 for each blade 20 in turn to allow the cutter blade to drop into engagement with the upper surface of member 119 and then retightening the wedge.

Those familiar with this art will readily ascertain that certain details of the disclosed apparatus and method could be varied without departing from the invention set forth. It is intended that such variations are within the scope of the invention.

The embodiments of the invention in which an exclusive property or privilege is claimed are defined as follows:

1. A milling cutter assembly having facility for alternate use for slot cutting and half side milling including a cutter body, a plurality of cutter blades, and a plurality of blade retaining wedges, each having means to fasten the wedge to said cutter body; said cutter body having a generally cylindrical configuration with a central axis, a pair of opposite axial ends, a periphery, and an axial bore; a plurality of spaced slots in said cutter body periphery extending between said axial ends, each slot having a forward face normal to both of said axial ends and having a rear face; said cutter blades each having a forward face and an opposite rear face and being located in respective ones of said slots with the forward face against said slot forward face; each of said cutter blades being retained in its slot by only a wedge; said cutter blades being laterally shiftable to enable protrusion of each blade on either axial end of said cutter body such that said blades can collectively protrude from both axial ends of said cutter body a controlled amount for slot cutting or can all protrude from either one axial end for side milling; and said retaining wedges being mounted in respective ones of said slots between the rear face of a cutter blade and the rear slot face; each slot containing only a blade and a wedge with its fastening means, enabling the blade to be laterally shiftable under the control of the wedge; and said retainer wedges being substantially centered in its slot such that maximum support of said blades with said wedges is maintained even with lateral shifting of said blades from one axial end of said cutter body to the other.

2. The assembly in claim 1 wherein each slot rear face is at a small acute wedging angle of substantially 7° radially inwardly relative to the adjacent slot forward face.

3. A milling cutter assembly including a cutter body, a plurality of cutter blades, and a plurality of blade retaining wedges; said cutter body having a generally cylindrical configuration with a central axis, a pair of opposite axial ends, a periphery, and an axial bore; a plurality of spaced slots in said cutter body periphery extending between said axial ends, each slot having a forward face normal to both of said axial ends and having a rear face; said cutter blades each having a forward face and an opposite rear face and being located in respective ones of said slots with the forward face against said slot forward face; and said retaining wedges being mounted in respective ones of said slots between the rear face of a cutter blade and the rear slot face, said cutter body having at least one annular, dirt collecting groove in each axial end.

4. The assembly in claim 2 wherein said retaining wedges are of greater width than said blades.

5. The assembly in claim 1 wherein each of said retaining wedges extends substantially the width of its respective slot; and said wedges have a relief in the rearward face thereof to assure effective contact with the adjacent cutter body rear slot face.

6. A milling cutter assembly including a cutter body, a plurality of cutter blades, and a plurality of blade retaining wedges; said cutter body having a generally cylindrical configuration with a central axis, a pair of opposite axial ends, a periphery, and an axial bore; a plurality of spaced slots in said cutter body periphery extending between said axial ends, each slot having a forward face normal to both of said axial ends and having a rear face; said cutter blades each having a forward face and an opposite rear face and being located in respective ones of said slots with the forward face against said slot forward face; and said retaining wedges being mounted in respective ones of said slots between the rear face of a cutter blade and the rear slot face, said wedges having a relief in the rearward face thereof to assure at least a two line contact with the adjacent cutter body rear slot face.

* * * * *